United States Patent [19]

Laberge

[11] Patent Number: 4,964,229
[45] Date of Patent: Oct. 23, 1990

[54] METHOD AND APPARATUS FOR VACUUM MOLDING MULTI-LAYER FOOTWEAR

[75] Inventor: Raymond Laberge, Comte de Chambly, Canada

[73] Assignee: Sport Maska, Inc., St. Hyacinthe, Canada

[21] Appl. No.: 306,011

[22] Filed: Feb. 3, 1989

[51] Int. Cl.$^5$ .......................... A43B 7/18; A43D 9/00; B29H 7/08

[52] U.S. Cl. .......................................... 36/93; 36/115; 12/142 P; 264/223

[58] Field of Search ..................... 36/88, 93, 115, 117, 36/119, 87; 12/142 N, 142 P, 146 C, 146 M; 264/223

[56] References Cited

U.S. PATENT DOCUMENTS

| | | | |
|---|---|---|---|
| 3,362,091 | 1/1968 | Drago | 36/87 |
| 3,848,286 | 11/1974 | Kahmann | 12/142 P |
| 3,848,287 | 11/1974 | Simonsen | 12/142 P |
| 3,895,405 | 7/1975 | Edwards | 36/93 |
| 3,896,202 | 7/1975 | Palau | 264/154 |
| 4,168,341 | 9/1979 | Siedenstrang et al. | 36/87 |
| 4,255,202 | 3/1981 | Swan, Jr. | 106/122 |
| 4,433,494 | 2/1984 | Courvoisier et al. | 36/93 |
| 4,654,986 | 4/1987 | George | 36/119 |
| 4,724,627 | 2/1988 | Sisco | 36/119 |
| 4,813,090 | 3/1989 | Ibrahim | 12/142 N |

FOREIGN PATENT DOCUMENTS 2310101  1/1977  France .................... 36/93

OTHER PUBLICATIONS

"Warm'n Form", Thermo-Mold Medical Products, Inc. 1974.

Primary Examiner—Steven N. Meyers
Attorney, Agent, or Firm—Fleit, Jacobson, Cohn, Price, Holman & Stern

[57] ABSTRACT

Multi-layer footwear formed of laminated layers of material which are sealed together with a polymeric glue used in the original manufacture of the footwear to secure the various layers of material together. The layers of material held together by polymeric glue are capable of being heated to a degree at which the footwear, when placed in a vacuum bag or compression chamber, is molded to adopt the shape of the foot inside the footwear under atmospheric pressure once pressure inside the bag is reduced or pressure in the compression chamber is increased. The footwear is heated to the point where the synthetic components of the layers of material are flexible under thermoforming conditions, but within a temperature range in which the polymeric glue continues to perform as an adhesive so that the sealed laminated surfaces do not separate. A polymeric glue is used because it can secure the laminated layers of material together during manufacture of the footwear and continue to perform as an adhesive during heating and cooling of the laminated layers of material in a custom-molded condition.

15 Claims, 4 Drawing Sheets

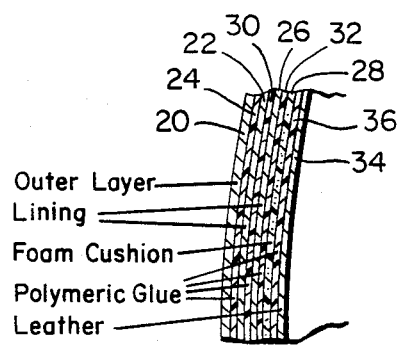
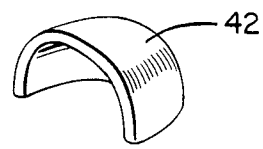
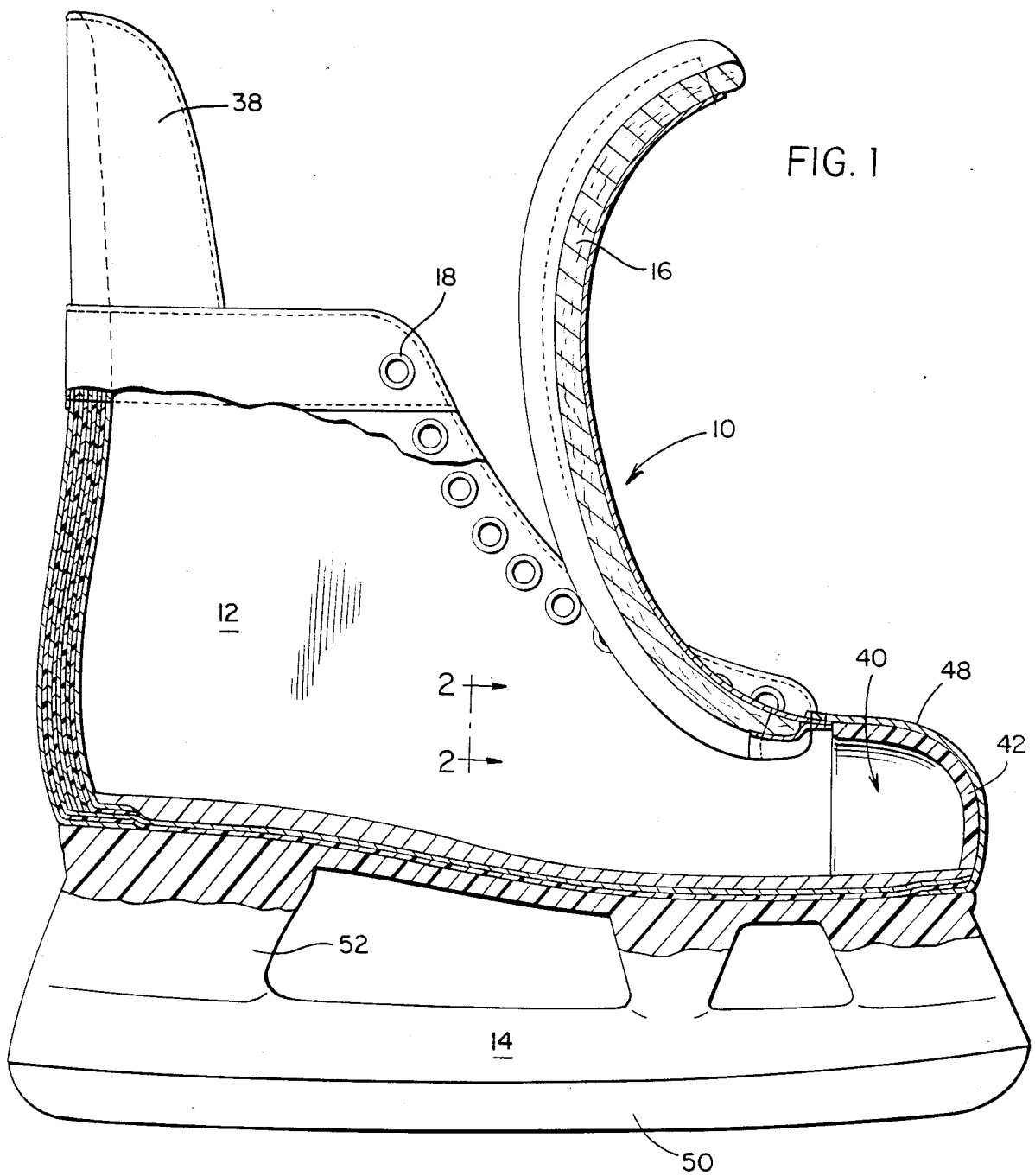

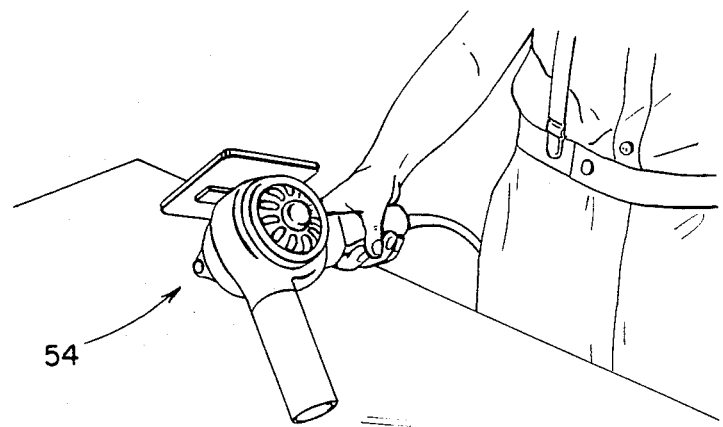
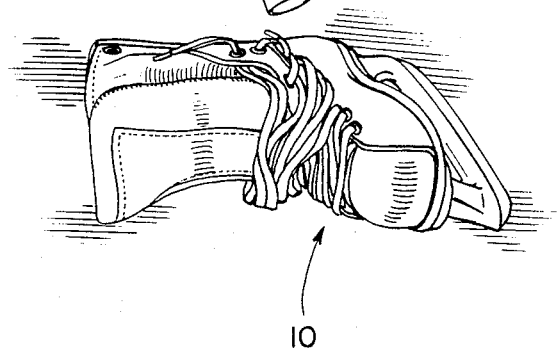
FIG. 4
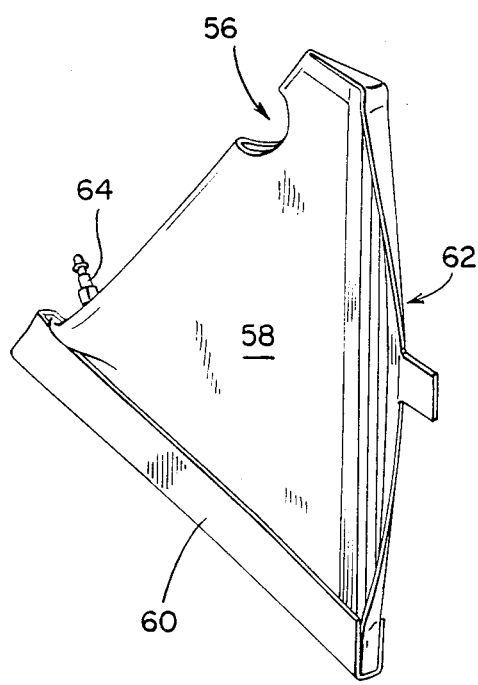
FIG. 5
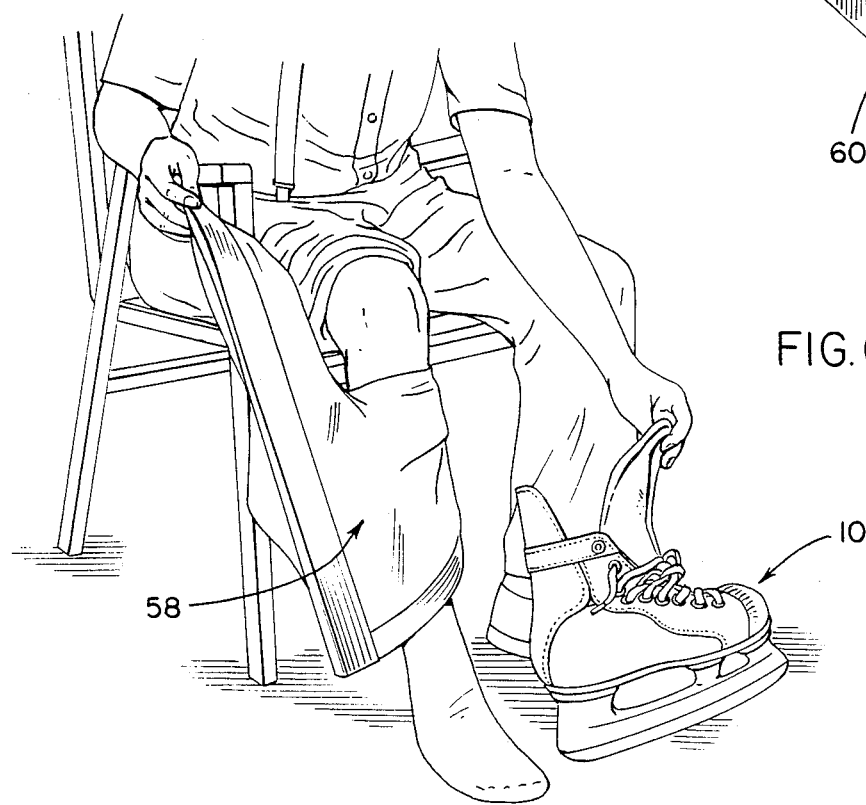
FIG. 6

METHOD AND APPARATUS FOR VACUUM MOLDING MULTI-LAYER FOOTWEAR

FIELD OF THE INVENTION

The present invention relates to pressurization molding of multi-layer footwear, such as ice skates, hockey skates, crosscountry ski boots, orthopedic shoes, or any other footwear having several layers of material. The layers of material are secured together by polymeric glue in which the footwear is heated and subsequently subjected to compression by a pressure differential to produce footwear which conforms to the shape of the wearer's foot.

BACKGROUND OF THE INVENTION

Several methods are know for molding footwear to the shape of the foot of the wearer. U.S. Pat. Nos. 3,848,287 and 3,848,286 to Simonsen and Kahmann, respectively, disclose typical processes for adapting a downhill ski boot to conform to the shape of the wearer's foot. In Simonsen and Kahmann, the wearer puts his or her foot in a ski boot formed primarily of thermoplastic material. The ski boot is then placed in a bag of plastic material having a melting point higher than the temperature at which the thermoplastic material of the boot was molded and the top of the bag sealed around the user's foot. After the thermoplastic material of the ski boot is heated to its softening temperature, but below the melting point of the bag, a vacuum applied to a vacuum line inside the bag evacuates air from inside the bag to allow atmospheric pressure to exert a force on the bag and to press the ski boot against the wearer's foot. While the vacuum is maintained inside the bag, the ski boot is cooled to below its softening temperature to produce a ski boot which conforms to the foot of the wearer.

Other methods of manufacturing protective footwear are disclosed in U.S. Pat. Nos. 3,896,202; 4,255,202; 4,724,627; and 4,654,986 to Palau; Swan, Jr.; Sisco; and George, respectively.

Most multi-layer footwear on the market today is manufactured according to a traditional process for making shoes, i.e., thermosetting certain parts of the skate and then manually gluing the component parts together.

A disadvantage inherent in the patents to Simonsen and Kahmann is that their application is limited to ski or other boots made entirely of molded thermoplastic material. If the processes disclosed in these references were used in conjunction with traditionally made multi-layer footwear, according to the process used for manufacturing shoes, the component layers would separate due to deterioration of the adhesives used to secure the laminated layers together.

SUMMARY OF THE INVENTION

By the present invention, multi-layer footwear having laminated layers of material secures the various layers together with a polymeric glue. The polymeric glue is used in place of traditionally used glues in the manufacture of multi-layer footwear to secure the various layers of material together. The layers of material held together by polymeric glue are capable of being heated to a degree at which the footwear, when placed in a vacuum bag or pressure chamber, is molded to adopt the shape of the foot inside the footwear under room atmospheric pressure once pressure inside the bag is reduced or when pressure in the pressure chamber is increased. The footwear is heated to the point where the layers of synthetic material of the footwear are flexible under thermoforming conditions, but within a temperature range below the melting point of the polymeric glue in which the polymeric glue continues to perform as an adhesive so that the heated laminated surfaces do not separate.

A polymeric glue is used because it can secure the laminated layers of material together during original manufacture of the footwear, soften when subjected to heat for molding of the footwear, yet continue to perform as an adhesive during cooling of the laminated layers of material of the footwear in a custom-molded condition. In contrast, common low temperature rubber and elastomer glues with liquefying solvent, as traditionally used in manufacturing shoes, are not suitable, since they lose their adhesive quality during the process of heating of footwear to be molded to a specific foot and subsequent cooling.

To assure proper fitting of the footwear of the invention, greater amounts of material are required around the part of the footwear that is made of moldable thermoforming material than is used in standard footwear currently available. In addition, the moldable thermoforming material is in different layers and sizes to provide the necessary rigidity in certain areas of the footwear and flexibility in others.

In the molding of the footwear, where there is a gap between the toes and the toe region of the footwear, it is essential that a protective cushion be inserted to fill the gap so that when a vacuum is applied to the bag surrounding the footwear during the molding process or the pressure chamber pressurized, blood does not rush into the toes, causing swelling to the extent that the toes occupy the entire gap and cause injury to the toes.

Accordingly, it is an object of the present invention to assemble multi-layer footwear including layers of material secured to each other by a polymeric glue.

It is another object of the present invention to assemble multi-layer footwear including layers of material secured to each other by a polymeric glue which can be heated and reheated without loss of adhesive quality.

It is a further object of the present invention to assemble multi-layer footwear including layers of material secured to each other by a polymeric glue which can be heated and reheated without loss of adhesive quality and to subject the footwear to reduced or elevated pressure to mold the footwear according to the shape of the foot inside the footwear.

It is yet another object of the present invention to assemble multi-layer footwear including layers of material secured to each other by a polymeric glue which can be heated and reheated without loss of adhesive quality and to subject the footwear to reduced or elevated pressure to mold the footwear according to the shape of the foot and having a permanent or removable toe support cushion to prevent injury due to the toes swelling.

These and other objects of the present invention, and many of its intended advantages, will become more readily apparent by referring to the following description, taken in conjunction with the accompanying drawings.

BRIEF DESCRIPTION OF THE DRAWINGS

FIG. 1 is a partial sectional view of a hockey skate.

FIG. 2 is a sectional view taken along line 2—2 of FIG. 1.

FIG. 3 is a perspective view of a rigid toe cap for a hockey skate.

FIG. 4 illustrates heating of a boot of a hockey skate.

FIG. 5 illustrates a vacuum bag.

FIG. 6 illustrates the vacuum bag located on a leg of the wearer prior to placing the hockey skate on the wearer's foot.

DETAILED DESCRIPTION OF THE PREFERRED EMBODIMENTS

Figure 7:
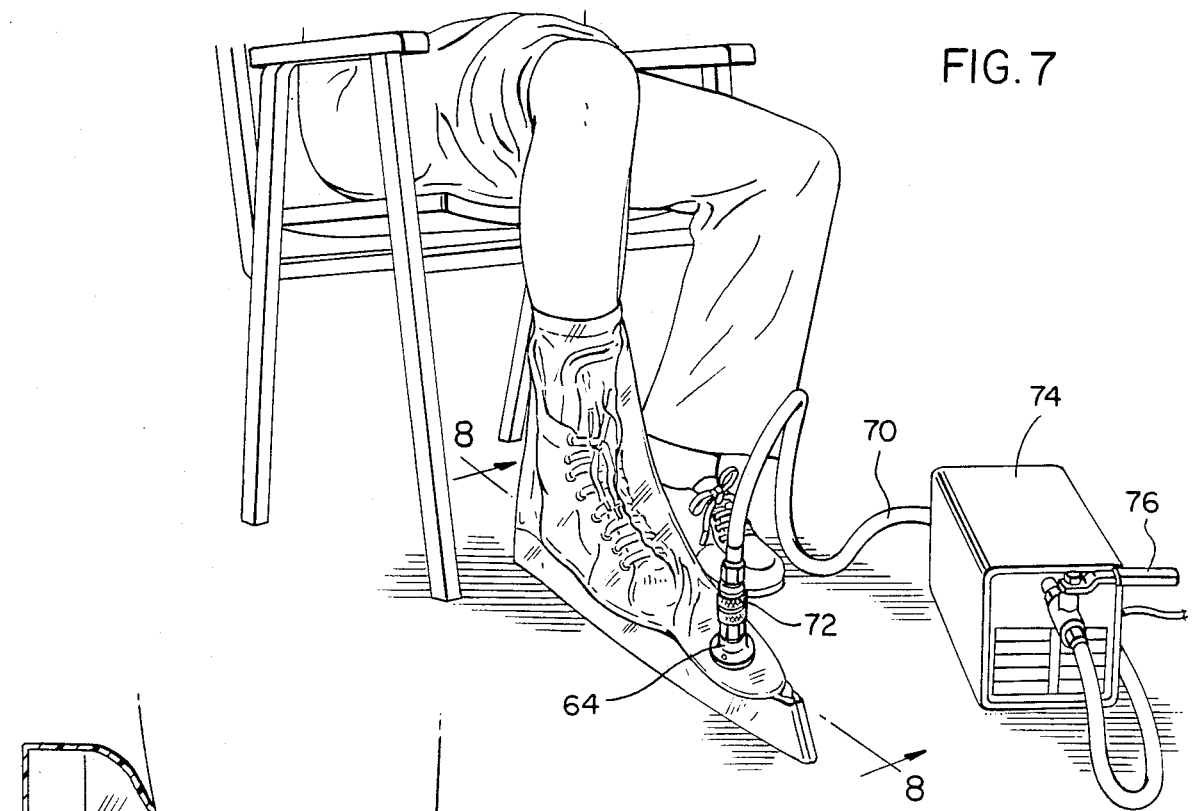
FIG. 7 illustrates application of a vacuum to the plastic bag sealed around the leg of the wearer and surrounding the hockey skate.

In describing a preferred embodiment of the invention illustrated in the drawings, specific terminology will be used for the sake of clarity. However, the invention is not intended to be limited to the specific terms selected, and it is to be understood that each specific term includes all technical equivalents which operate in a similar manner to accomplish a similar purpose.

With reference to the drawings in general, and to FIGS. 1-3 in particular, a hockey skate embodying the teachings of the present invention is generally designated as 10. A hockey skate is used for illustrative purposes and is intended to represent practicing of the invention on all multi-layer footwear which require gluing of their component layers. Ice skates, cross-country ski boots, orthopedic shoes, as well as other footwear having glued laminated layers, are envisioned as being included in the invention.

The skate 10 includes a boot 12 and blade 14. The boot 12 includes a tongue 16 and shoelace eyelets 18 through which a shoelace is threaded for tightening and loosening the boot.

The boot includes layers of material which are secured together by a polymeric glue. The components of the boot include a combination of layers of leather and synthetic materials, such as nylon, polyethylene, foam, and polyvinyl chloride, to name a few.

In the cross-section illustrated in FIG. 2, an outer layer 20 is black woven nylon (commonly referred to as "ballistic nylon" due to its cut-proof quality) secured to an outer lining 22 by polymeric glue layer 24. Similarly, an inner lining 26 is secured between lining 22 and foam cushion layer 28 by polymeric glue layers 30 and 32, respectively. The innermost layer 34, made of leather or other suitable material, is secured to the foam cushion layer 28 by polymeric glue layer 36. The component layers of the boot will vary over different portions of the boot. For example, to reinforce the side and rear portions of the boot, a plastic material available under the tradename ABS or SURLYN, available from DuPont, is used, or non-woven cotton hot-melt impregnated fabric coated at the manufacturing plant with polymeric glue, which can be reactivated by heat application. Reinforcement layer material made of thermoforming material is available under the tradename MEGABIX from Bixby Company of Canada. At the left and right sides of the ankle, a bag containing a thixotropic material which is pliable, yet capable of cushioning the ankle bone, may form part of the boot. A lower leg support 38 of polyvinyl chloride (PVC) plastic material is shaped and cut to surround the rear upper portion of the boot.

In the toe region 40, a rigid plastic toe cap 42 (best shown in FIG. 3) is covered with an exterior layer 48. A steel skate blade 50 is embedded in and connected to the bottom of the boot 12 by a rigid plastic support 52.

All the component layers of the boot are secured to each other by a polymeric glue, such as, for example, 3M brand glue No. 4693 made of styrene butadiene. Any other polymeric glue may be used. A polymeric glue, for purposes of this application, is defined as a glue made from one of (1) a rubber base, (2) thermoplastic hot-melt, or (3) PUR (polyurethane resin), combined with a polymeric plasticizer, which results in a high temperature resistant glue. The essential quality of the glue is that it has a higher melting point than the softening temperature of the synthetic component layers of material which form the boot such that during repeated heating and cooling procedures for molding of the boot, the glue will not lose its adhesive effectiveness. The glue is able to withstand the temperatures required to soften the synthetic component layers of the boot required to mold the boot while maintaining the adhesive qualities of the polymeric glue.

To mold the boot to the shape of a wearer's foot, the boot 12 of the skate 10 is heated by a heating device 54, as shown in FIG. 4. The heating device may be an industrial-type hot air fan, as shown in FIG. 4, or any similar device capable of heating the synthetic component layers to their softening temperature, typically to a temperature between 175° and 275° F., and preferably to a temperature between 200-225° F. The heating device shown generates a temperature in the range of 350-500° F. at its nozzle such that heating of the boot for a period of approximately five minutes softens the synthetic layers of the boot.

Next, the leg of the wearer is inserted through the opening 56 of the two-sided vacuum bag 58. The bag is made of silicon sheeting similar to that used in the aerospace industry for vacuum molding. At a lower extremity of the bag 58 is a rigid plastic sheath 60 of cut-proof nylon for receiving and supporting the metallic blade 50 of the skate 10. At the rear of the bag 58 is a sealable closure 62 of a press type to force interengagement of male and female portions for sealing the bag once the leg of the operator is placed in opening 56 (as shown in FIG. 6). The opening 56 is of a size sufficient to seal the bag 58 around the leg of the wearer. An air valve stem 64 projects from the bag to communicate between the interior of the bag and the surrounding environment.

Figure 8:
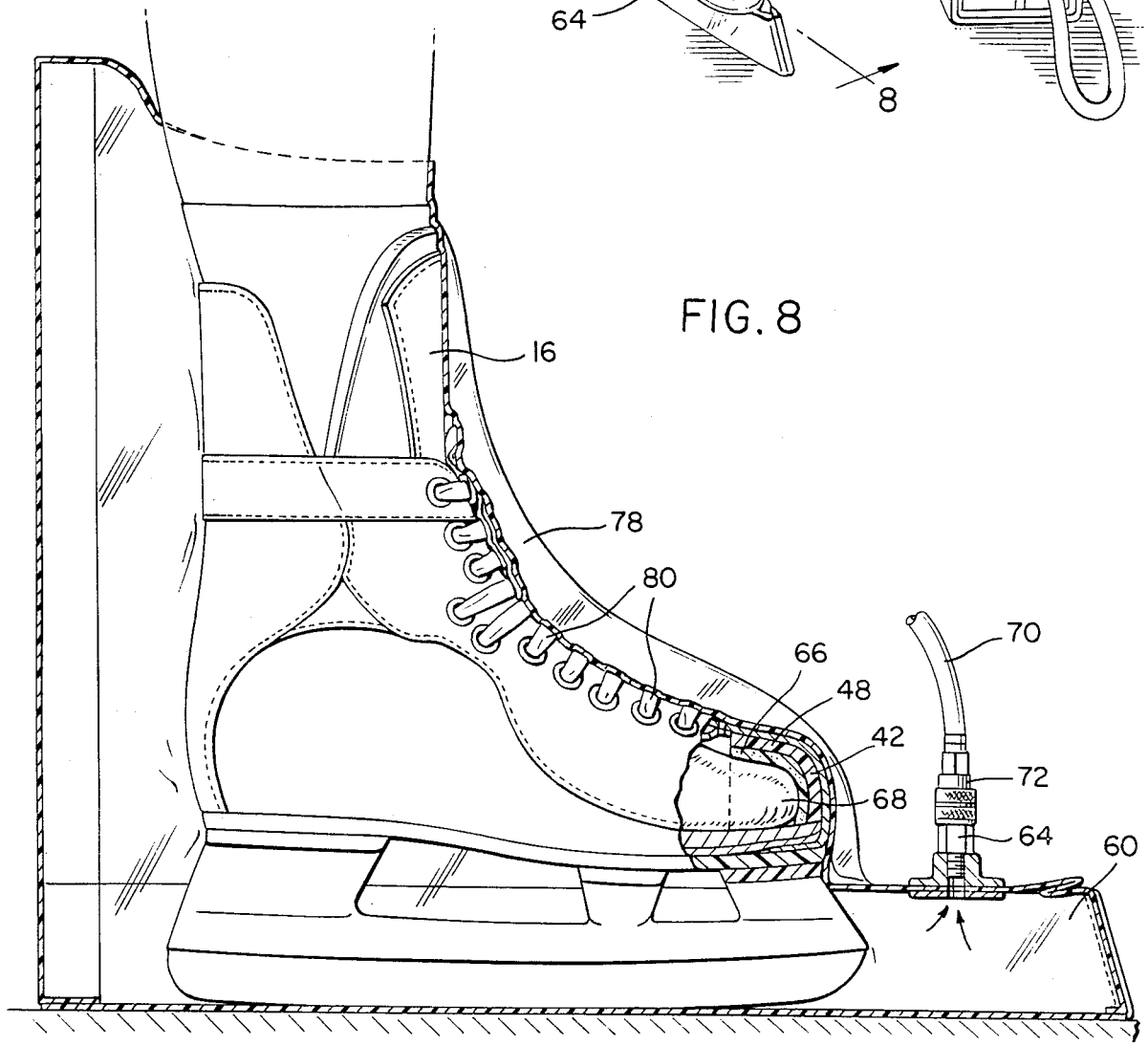
FIG. 8 is a partial sectional view of the evacuated plastic bag surrounding the hockey skate on the leg of the wearer taken along line 8—8 of FIG. 7.

After the bag 58 is wrapped around the leg of the wearer, a compressible material 66 (as shown in FIG. 8) is inserted in the skate between the sock 68 and the toe cap 42 so as to be located in the cavity between the sock 68 or the bare foot and the toe cap prior to evacuation of the bag 58. The compressible material 60 is made of low density closed cell foam or other suitable material and is of sufficient mass to cover the toes of the wearer and fill the cavity between the toes and the toe cap of the skate. The compressible material prevents blood from rushing to the toes of the wearer to cause swelling and injury during evacuation of the bag. After the boot has been molded to the foot of the wearer, the compressible material may be removed from the boot, or the compressible material may be permanently secured in the footwear depending on the use for the footwear.

In FIG. 7, a vacuum line 70 is shown connected to the valve stem 64 by coupling 72. A vacuum device 74 having an on/off lever 76 provides suction through vacuum line 70 to the valve stem 64 to evacuate air from inside the bag 58. The boot is tightened by laces to secure the boot to the foot of the wearer. When the bag 58 is sealed about the leg of a wearer and the closure 62 is secured, pressure within the bag is reduced by vacuum device 74 to a pressure of between 15 and 29 inches of mercury.

As shown in FIGS. 7 and 8, the reduction of pressure within the bag allows the atmospheric pressure surrounding the bag to exert force on the boot, pressing the bag against the boot and molding the pre-heated materials of the boot against the foot of the wearer. The sidewalls of the bag 58 above the boot are compressed against each other in the area 78, as shown in FIGS. 7 and 8, and the laces 80 are compressed by the force of atmospheric pressure surrounding the bag to press the bag against the tongue 16 in the spaces between the laces. Such compression occurs all over the boot so as to force the pre-heated moldable material of the boot into the configuration of the wearer's foot.

During the molding step, it may be necessary to reheat the boot by application of additional heat from the heating device. Additional heat may be transferred to the boot through the vacuum bag 58 if it is felt that too much time has expired and the boot is beginning to cool.

When the vacuum device 74 is deactivated, air refills the vacuum bag 58 and normalizes pressure between the exterior and interior of the bag. The polymeric glue holding the layers of the boot together retains its adhesive effectiveness during the molding process and as the boot cools, and the result is a boot which closely conforms to the shape of the wearer's foot.

Figure 9:
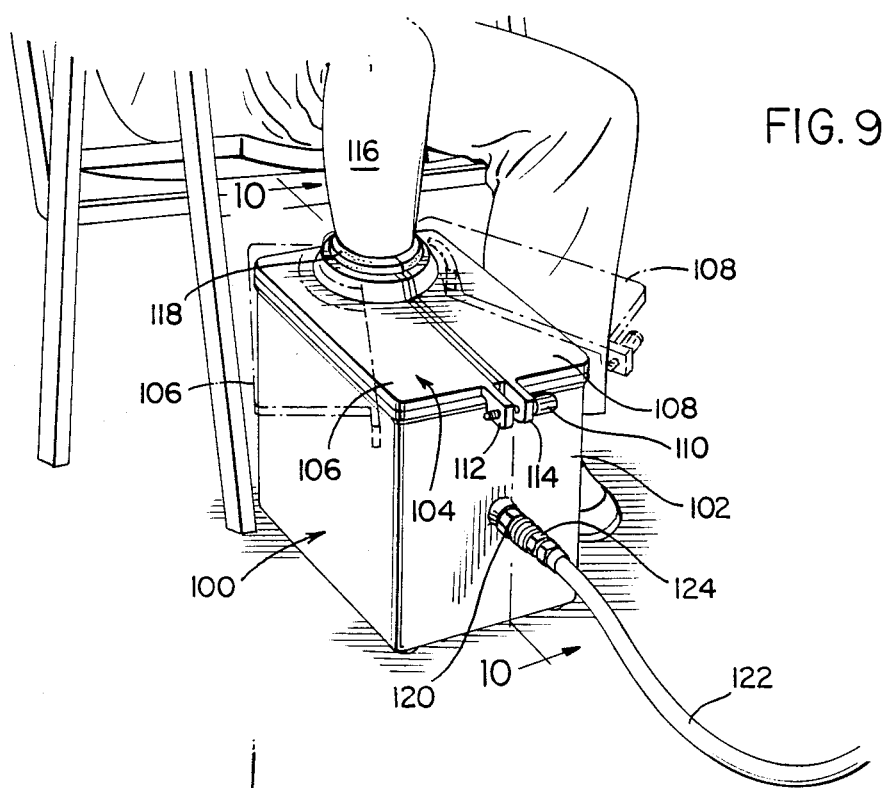
FIG. 9 illustrates a foot of a wearer sealingly clamped in a pressurization chamber.

In FIG. 9, a compression chamber 100 is shown which includes a container 102 and a lid 104 having two pivoted sections 106 and 108. In FIG. 9, the lid sections 106 and 108 are shown secured together by screw clamp 110, which extends through two tabs 112 and 114 mounted, respectively, on each of the lid sections 106 and 108. A leg 116 of the wearer extends through a hard rubber gasket 118 to sealingly engage the leg within the compression chamber 100. Lid sections 106 and 108 are shown in a pivoted apart location in phantom lines to facilitate entry of the foot and footwear. A pressurization valve 120 extends through the sidewall of the pressurization chamber to communicate between the interior and exterior of the pressurization chamber. A pressure line 122 having a clamping fixture 124 is secured to the valve 120 so as to introduce pressurized air into the pressurization chamber 100.

Figure 10:
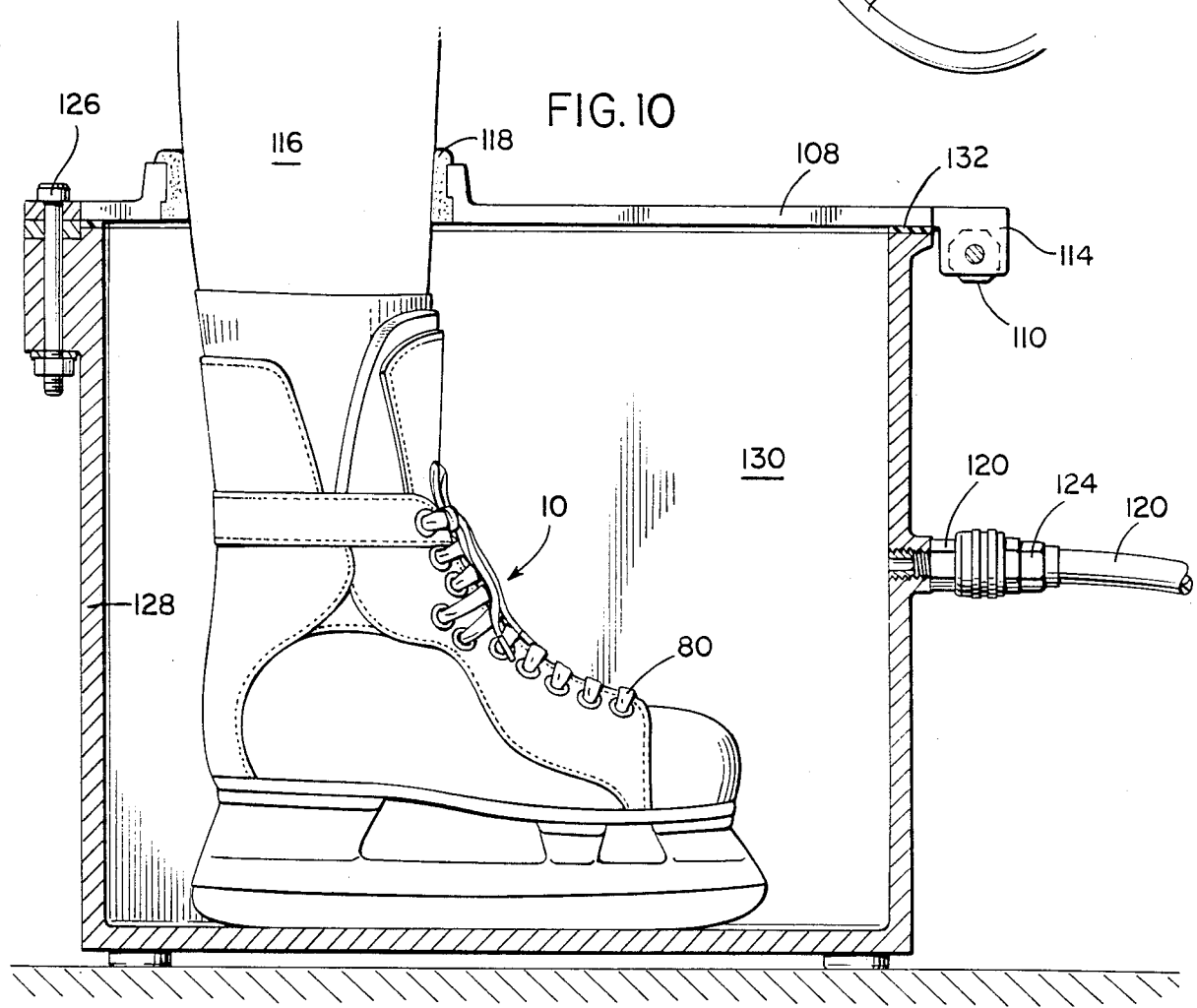
FIG. 10 is a sectional view taken along line 10—10 of FIG. 9.

In FIG. 10, the pivot pin 126 is shown as being secured to a sidewall 128 of the pressurization chamber 100. The interior chamber 130 is sealed when the leg of the wearer of skate 10 is placed in the chamber 130, and the lid sections 106 and 108 are pivoted to meet and be locked by clamp 110. A gasket 132 further aids in sealing the chamber 130.

After the skate 10 is heated, as shown and described with reference to FIG. 4, the skate is laced onto the foot of the wearer; and a cushion layer, as disclosed with reference to FIG. 8, is located in the cavity between the toes and the toe cap of the boot. An air pump pressurizes air and forces it through hose 122 and coupling 124 located on valve 120 to pressurize the atmosphere within the chamber 130. A preferred pressure of 45 to 60 inches of mercury is produced within the chamber 130. The pressure in the chamber forces the thermoforming layers of material of the boot towards the foot of the wearer so as to mold the boot to the shape of the wearer's foot. Similar to the pressurization by the atmospheric pressure on the skate in the evacuated bag, as shown in FIGS. 7 and 8, the pressure of the atmosphere surrounding the skate is of sufficient force to force the component layers of the boot against the foot of the wearer to produce a custom-fit boot.

In an alternate embodiment, the skate may be located in a vacuum bag similar to the bag shown in FIG. 5, and a rigid outlet hose is placed in the bag and communicates with the exterior of the compression chamber 100. Upon increase of the pressure within the chamber, the air within the bag and surrounding the skate will be forced out through the rigid hose, and pressure applied against the softened thermoforming component layers of the boot so as to mold the boot to the shape of the foot of the wearer.

Having described the invention, many modifications thereto will become apparent to those skilled in the art to which it pertains, without deviation from the spirit of the invention as defined by the scope of the appended claims.

I claim:

1. Remoldable multi-layer footwear capable of being molded on more than one occasion, said footwear comprising:
    a boot,
    said boot including a plurality of layers of material, said plurality of layers include natural and synthetic thermoplastic material of various segments, patterns and shapes located in different areas of said boot for varying flexibility at different areas of said boot, said plurality of layers being secured to each other by polymeric glue, said polymeric glue being capable of maintaining its adhesive effectiveness over repeated heating and cooling, said polymeric glue having a melting point higher than a softening temperature of synthetic components of said plurality of layers so that when said boot is heated and then molded by a pressure differential, said polymeric glue maintains its adhesive effectiveness to secure said layers of material together.

2. Moldable multi-layer footwear as in claim 1, wherein said boot is part of a hockey skate.

3. Remoldable multi-layer footwear as claimed in claim 1, wherein said plurality of layers includes at least one layer made of nylon, polyethylene, and polyvinyl chloride.

4. An apparatus for forming remoldable multi-layer footwear, said apparatus comprising:
    a boot having a plurality of layers of material, said plurality of layers include natural and synthetic thermoplastic material of various segments, patterns and shapes located in different areas of said boot for varying flexibility at different areas of said boot, said plurality of layers being secured to each other by polymeric glue, said polymeric glue being capable of maintaining its adhesive effectiveness over repeated heating and cooling, said polymeric glue having a melting point higher than a softening temperature of synthetic components of said plurality of layers,
    heat means for heating said boot to a temperature greater than said softening temperature of said synthetic components of said plurality of layers and less than said melting point of said polymeric glue so as to soften said boot, and pressure means for surrounding said boot and sealing an enclosed area around said boot when said boot is located on a foot of a wearer and for pressurizing said enclosed area so as to compress said boot against the foot of the wearer by pressure differential and mold said boot to the configuration of the foot of the wearer.

5. The apparatus of claim 4, wherein cushion means are located between he toes of the foot of the wearer and a toe region of said boot for preventing swelling of the toes and thereby preventing injury.

6. The apparatus of claim 4, wherein said pressure means includes a vacuum bag for surrounding said boot and a vacuum pump with a vacuum line to evacuate air form said vacuum bag.

7. The apparatus of claim 4, wherein said softening temperature of said synthetic components of said plurality of layers is between 175° to 275° F.

8. The apparatus of claim 7, wherein said softening temperature of said synthetic components of said plurality of layers is between 220° to 225° f.

9. The apparatus of claim 4, wherein said pressure means includes a pressurization chamber for increasing molding pressure, above atmospheric pressure when said boot is located in said pressurization chamber to force said boot to be molded against the foot of the wearer.

10. The apparatus of claim 4, wherein said boot is part of a hockey skate.

11. A method for molding multi-layer footwear to the foot of a wearer, said method comprising:

heating a boot to a temperature above a softening temperature of synthetic components of a plurality of layers of material which form said boot, said plurality of layers being secured to each other by a polymeric glue having a melting point above said softening temperature of said synthetic components of said plurality of layers, said heating being to a temperature less than said melting point of said polymeric glue, enclosing an area including said boot on a foot of a wearer, and pressurizing said area so that pressure differential compresses said plurality of layers of said boot against the foot of the wearer to form a custom-fit boot while said polymeric glue maintains its adhesive effectiveness.

12. The method of claim 11, further comprising the step of a locating a cushioning layer between the toes of the wearer and a toe region of said boot prior to said pressurizing step and removing said cushioning layer after said pressurizing step.

13. The method of claim 11, wherein a pressure in said area is reduced to between 15 and 29 inches of mercury.

14. The method of claim 11, wherein a pressure in said area is increased to between 45 and 60 inches of mercury.

15. The method of claim 10, wherein said boot is part of a hockey skate.

* * * * *